June 26, 1934.  J. L. McCOY  1,964,642
PIPE REPAIR DEVICE
Filed Dec. 13, 1932  2 Sheets-Sheet 1
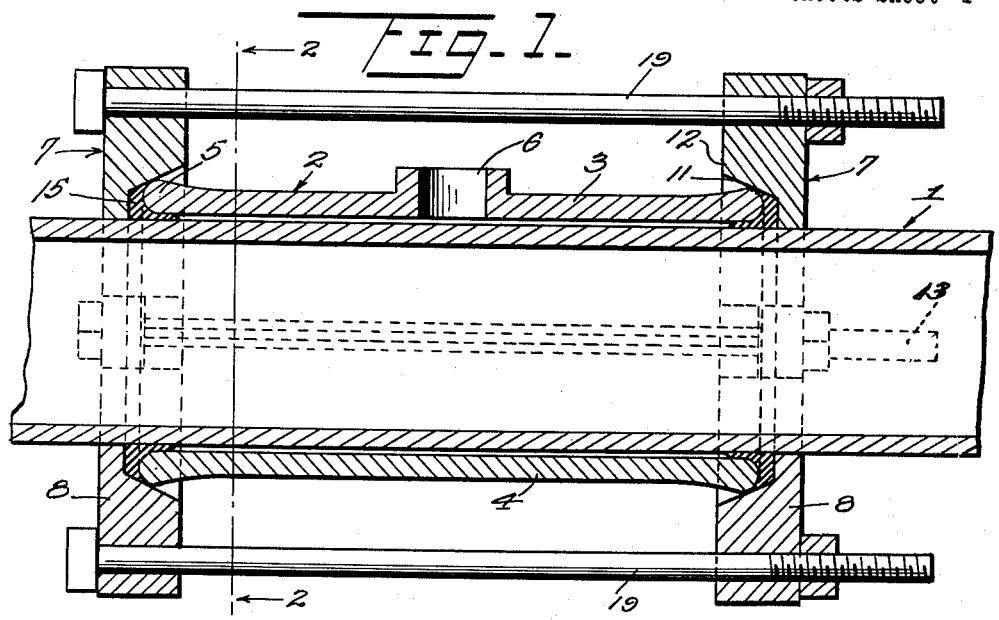
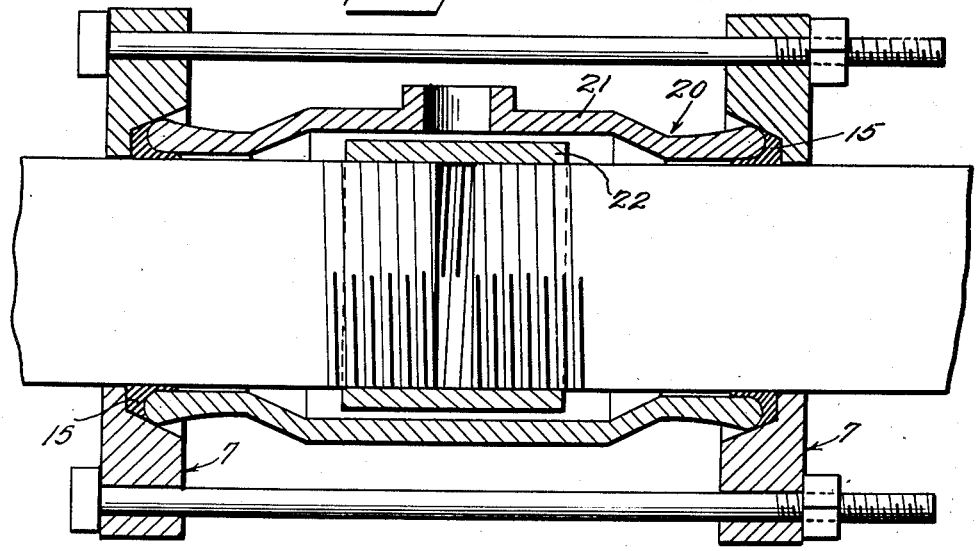
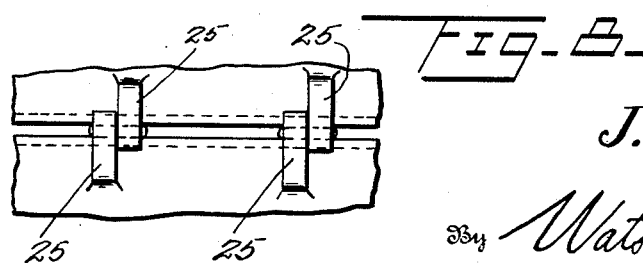
Inventor
J. L. McCoy
By Watson E. Coleman
Attorney

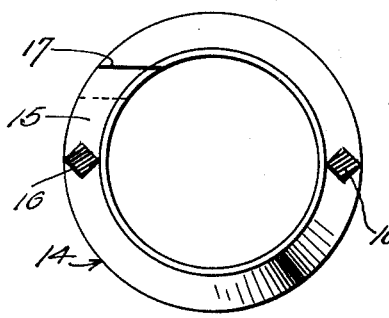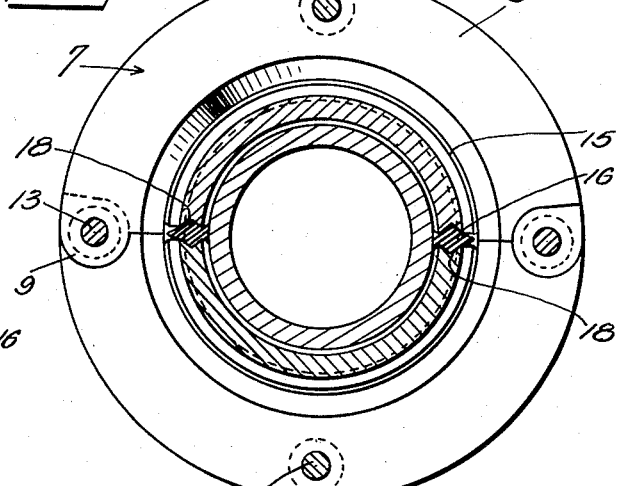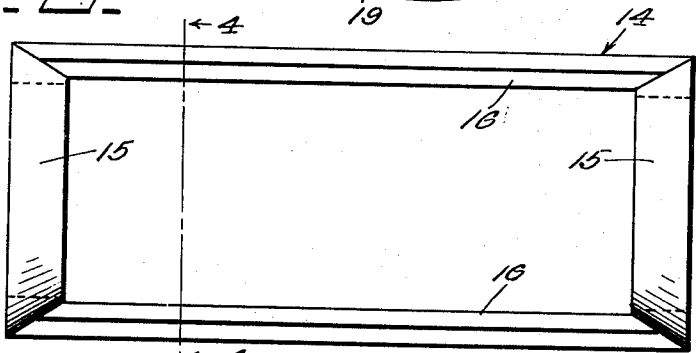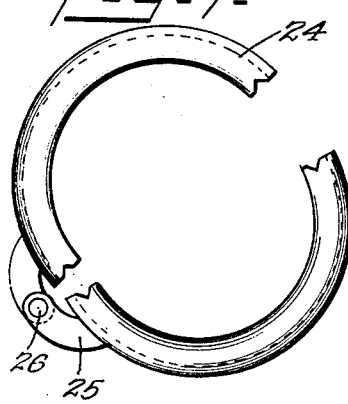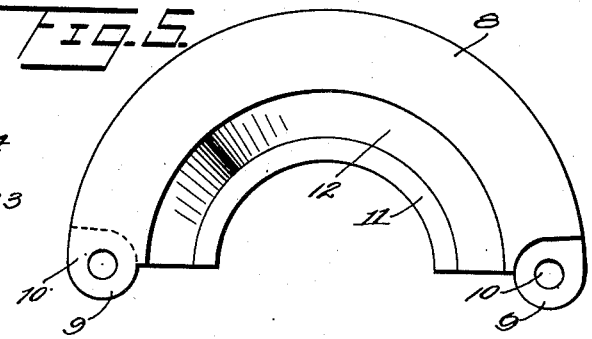

Patented June 26, 1934

1,964,642

UNITED STATES PATENT OFFICE 1,964,642

PIPE REPAIR DEVICE

John Lee McCoy, Riverside, Calif.

Application December 13, 1932, Serial No. 647,061

9 Claims. (Cl. 137—99)

This invention relates to improvements in devices for repairing broken or ruptured water pipes and pertains particularly to a device of the character designed to encircle the pipe.

The primary object of the present invention is to provide a device which may be easily and quickly applied to any water, steam, gas or oil pipe or main and which will efficiently stop leakage from a rupture thereof or from a joint.

Another object of the invention is to provide a device for stopping leaks in pipes which is applied without the use of caulking, lead pouring or any of the other processes commonly employed for closing joints.

Another object of the invention is to provide a device which will seal itself as it is drawn into position about a pipe and which may be applied without removing the pressure therefrom.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in longitudinal section through a pipe and a device of the character embodying the present invention which is in applied position thereon;

Figure 2 is a view in transverse section taken substantially upon the line 2—2 of Figure 1;

Figure 3 is a view in side elevation of the gasket or packing which forms a part of the device;

Figure 4 is a sectional view taken transversely upon the line 4—4 of Figure 3;

Figure 5 is a view in elevation of the interior of one of the halves of an end plate of the device;

Figure 6 is a view in longitudinal section through a modified form of the device, showing the same applied to a pipe line over a sleeve or coupling joining two pipe sections together;

Figure 7 is a view in end elevation of a modified form of the split sleeve unit of the device;

Figure 8 is a view in elevation of the hinged portion of the modified form of sleeve.

Referring now more particularly to the drawings wherein like numerals of reference indicate corresponding parts throughout the several views, the numeral 1 indicates a portion of a pipe which is shown in longitudinal section and to which the present repair device is shown applied. The repair device consists of a sleeve which is indicated as a whole by the numeral 2, which sleeve is longitudinally split to form the sections 3 and 4. As shown in Figure 1 the ends of these sleeve sections are slightly enlarged and rounded so as to form the ball edge 5. One of the sections 3 has a tapped outlet 6 formed integral therewith which is closed after the device has been placed in working position as will be hereinafter more fully described.

At each end of the sleeve 2 there is positioned an annular plate which is indicated generally by the numeral 7. Each of these plates is formed in two semi-circular portions indicated by the numerals 8 and the ends of these portions are formed to provide the ears 9 which are apertured as indicated at 10 and which are arranged in overlapping relation when the annulus is fitted about the pipe 1. One face of each section 8 is provided with an arcuate channel 11 which has an inclined back wall 12. These channels come together when the plate sections are assembled, to form a complete channel about the pipe in which a gasket may be located. As shown in Figure 1 the plates 7 are assembled so that the channels 11 are in opposed relation and the overlapping ears 9 of one plate section are secured together and coupled with the ears of the other plate sections by means of the long bolts 13.

The rounded ends of the sleeve 2 are positioned in the opposed recesses 11 of the end plates or collars and before the plates are drawn together against the ends of the sleeve there is placed in position the gasket which is shown in Figure 2 and indicated as a whole by the numeral 14. This gasket comprises two split end rings each of which is indicated by the numeral 15, which are connected by the bars 16 which, as shown in Figure 4, are of rectangular cross section. The split of one ring is shown in Figure 4 and indicated by the numeral 17. This gasket is formed of any suitable compressible material such, for example, as rubber or a rubber composition and after the end rings 15 have been placed in position about the pipe 1 and are located in the adjacent channels 11 of the pipe encircling collars, the connecting bars between the rings are located between the opposed edges of the sections 3 and 4 of the sleeve. These edges of the sleeve are formed to provide the annular groove 18 so that an edge of the gasket bar 16 positions therein as shown in Figure 2. After assembling the parts in the manner described the bolts 13 have the nuts tightened up thereon so as to draw the plates 7 together. The rounded ends of the sleeve 2 will thus be forced against the inclined walls of the adjacent channels 11 and cammed in toward the pipe 1, thus compressing the bar portion 16 of the gasket between the edges of the split sleeve and at the same time compressing the ring portions 15 in the channels 11 and between the pipe and the ends of the sleeve.

The collars or annular plates 7 are provided with additional bolt apertures besides those through the ears 9 and through these apertures the additional bolts 19 are extended in the manner illustrated in Figure 1. The plates 7 are thus connected by four bolts which extend the length of the device and by means of which the plates may be securely drawn together to force the sections 3 and 4 of the sleeve together for the proper compression of the gasket and the closing of the joints between the pipe, the plates 7 and the ends of the sleeve 2.

During the application of the device to a pipe the tapped outlet 6 remains open so that water escaping from the pipe will be free to pass through the sleeve. After the device has been applied and the plates 7 drawn firmly into position, the tapped outlet 6 may be closed by a suitable plug so that the further escape of water from the pipe will be effectively shut off.

In Figure 6 there is illustrated a modified form of the sleeve shown in Figure 1 and indicated by the numeral 2. In this form each of the two portions of the sleeve which is here indicated generally by the numeral 20, has an off-set relatively broad central portion 21 which, when the portions are secured together in the manner illustrated, provides the sleeve with a complete central annular off-set which provides room for a coupling 22 when it is desired to use the device to shut off a leaking joint. With the exception of this off-set feature of the sleeve portions, the device is the same as shown and illustrated in Figure 1.

In Figure 7 a slightly modified form of sleeve is illustrated. This sleeve is indicated as a whole by the numeral 23 and the two halves thereof are each indicated by the numeral 24. In this form the halves 24 are provided with two or more hinge ears 25 which project beyond the adjacent edges of the halves to which they are applied and the ears of one half are connected with those of the other half by a pivot pin 26 so that the halves may be permanently connected and readily swung apart for the application of the sleeve to the pipe and also for the insertion of the gasket 14.

From the foregoing it will be readily apparent that the device herein disclosed may be made of any size or length to suit the particular type of break or leak which it is to shut off and it will also be apparent that the device may be applied to a pipe without having to make any cuts therein or without having to close off the water pressure.

Due to the fact that the parts are secured together and the joints closed without the use of caulking, no jarring of the pipe will take place as would be the case if caulking were used, and, therefore, the device may be applied to pipes which might be in such a weakened condition that further ruptures would occur if hammering thereon were attempted.

In addition to using the tapped outlet 6 in the manner previously described it will be obvious that this outlet may be employed as a means for making a lateral connection with a pipe after the pipe has been drilled to form a suitable outlet opening therein.

By this means the device, instead of being used as a means of stopping a leak in a pipe line, may be employed as a means for taking off a lateral connection in a pipe which has already been laid.

Having thus described the invention, what is claimed is:—

1. A pipe repair device, comprising a longitudinally split sleeve adapted to encircle the pipe, a gasket comprising a pair of annular members and a pair of connecting members between the annular members, said annular members of the gasket being designed to encircle the pipe and position against the ends of the sleeve and said connecting members being designed to position between the opposed faces of the parts of the split sleeve, and means for forcing the parts of the sleeve together to compress the connecting portions of the gasket therebetween and said means also compressing the annular portions of the gasket between the ends of the sleeve and the pipe.

2. A pipe repair device, comprising a two-part longitudinally divided sleeve designed to encircle a pipe, a pipe encircling member at each end of the sleeve, connecting means between said last members and gasket material interposed between each end of the sleeve and the adjacent pipe encircling member and compressed by the member and forced between the pipe and the end of the sleeve and between the confronting edges of the sleeve for preventing leakage of fluid, said pipe encircling members being formed to receive and engage the adjacent ends of the sleeve and to force the portions of the sleeve together as the members are drawn together against the ends of the sleeve.

3. A pipe repair device, comprising a longitudinally divided sleeve designed to encircle a pipe, a pair of annular members constituting pipe encircling collars and designed to have the sleeve disposed therebetween, said collars having their confronting faces provided with annular channels in which the ends of the sleeve position, connecting means between the collars whereby the same are drawn together against the ends of the sleeve, and a gasket comprising a unit composed of two split rings connected by a pair of bar members, said rings being disposed in said collar channels and compressed therein between the ends of the sleeve and the pipe and said bar members being disposed between the confronting edges of the portions of the sleeve.

4. A pipe repair device, comprising a longitudinally divided sleeve designed to encircle a pipe, a pair of annular members constituting pipe encircling collars and designed to have the sleeve disposed therebetween, said collars having their confronting faces provided with annular channels in which the ends of the sleeve position, connecting means between the collars whereby the same are drawn together against the ends of the sleeve, and a gasket comprising a unit composed of two split rings connected by a pair of bar members, said rings being disposed in said collar channels and compressed therein between the ends of the sleeve and the pipe and said bar members being disposed between the confronting edges of the portions of the sleeve, said channels having outwardly inclining walls against which the end edges of the sleeve slide to effect the forcing together of the sleeves as the collars are drawn together.

5. A pipe repair device, comprising a pipe encircling sleeve longitudinally divided to form two portions, a pair of two-part annular plate members constituting pipe encircling collars disposed at each end of the sleeve, each of said collars having an annular channel in its inner face, bolts connecting said collars to facilitate drawing the same together against the ends of the sleeve, a gasket comprising a pair of split rings having connecting bars therebetween, said connecting bars being designed to position between the opposed edges of the two portions of the sleeve and said rings encircling the pipe between the ends of the sleeve and the collars and positioning in said channels, and hinge means connecting two adjacent edges of the two portions of the collar.

6. A pipe repair device, comprising a longitudinally split pipe encircling sleeve, a gasket formed of two split rings and two bars connecting the rings, said bars being designed to position between the edges of the split sleeve and the rings encircling the pipe at the ends of the sleeve, pipe encircling members compressing said rings between the pipe and the adjacent ends of the sleeve, and a nipple formed integral with one of said sleeve sections to provide fluid escape means during the assembling of the device.

7. A pipe repair device, comprising a two-part longitudinally divided sleeve designed to encircle a pipe, a pipe encircling member at each end of the sleeve, connecting means between said members for drawing the same together, means forming a part of each member for engaging the adjacent ends of the sleeve and forcing the two parts thereof together when the said members are drawn together, and gasket material interposed and compressed between the ends of the sleeve and the adjacent members and between the two parts of the sleeve.

8. A pipe repair device, comprising a two-part longitudinally divided sleeve designed to encircle a pipe, a pair of pipe encircling members between which said sleeve positions, annular cam surfaces upon the confronting faces of said members against which the adjacent ends of the sleeve abut and by which the sleeve parts are forced together, means connecting said members for drawing the same together against the interposed sleeve, and gasket material disposed and compressed between the ends of the sleeve and the adjacent members and between the adjacent opposing parts of the sleeve.

9. A pipe repair device, comprising a longitudinally divided two-part sleeve designed to encircle a pipe, said sleeve having the confronting edges of the two portions recessed longitudinally, a pair of members designed to encircle the pipe with said sleeve interposed therebetween, means forming annular cam surfaces upon the confronting faces of said members against which the ends of the sleeve engage, means connecting the members for drawing the same together, and a gasket comprising a unit composed of two split rings connected by a pair of bar members, said rings being disposed between the ends of the sleeve and the adjacent members and said bars being interposed between the confronting edges of said sleeve portions and adapted to be forced into the recesses thereof when the portions are forced together.

JOHN L. McCOY.